Figure 1:
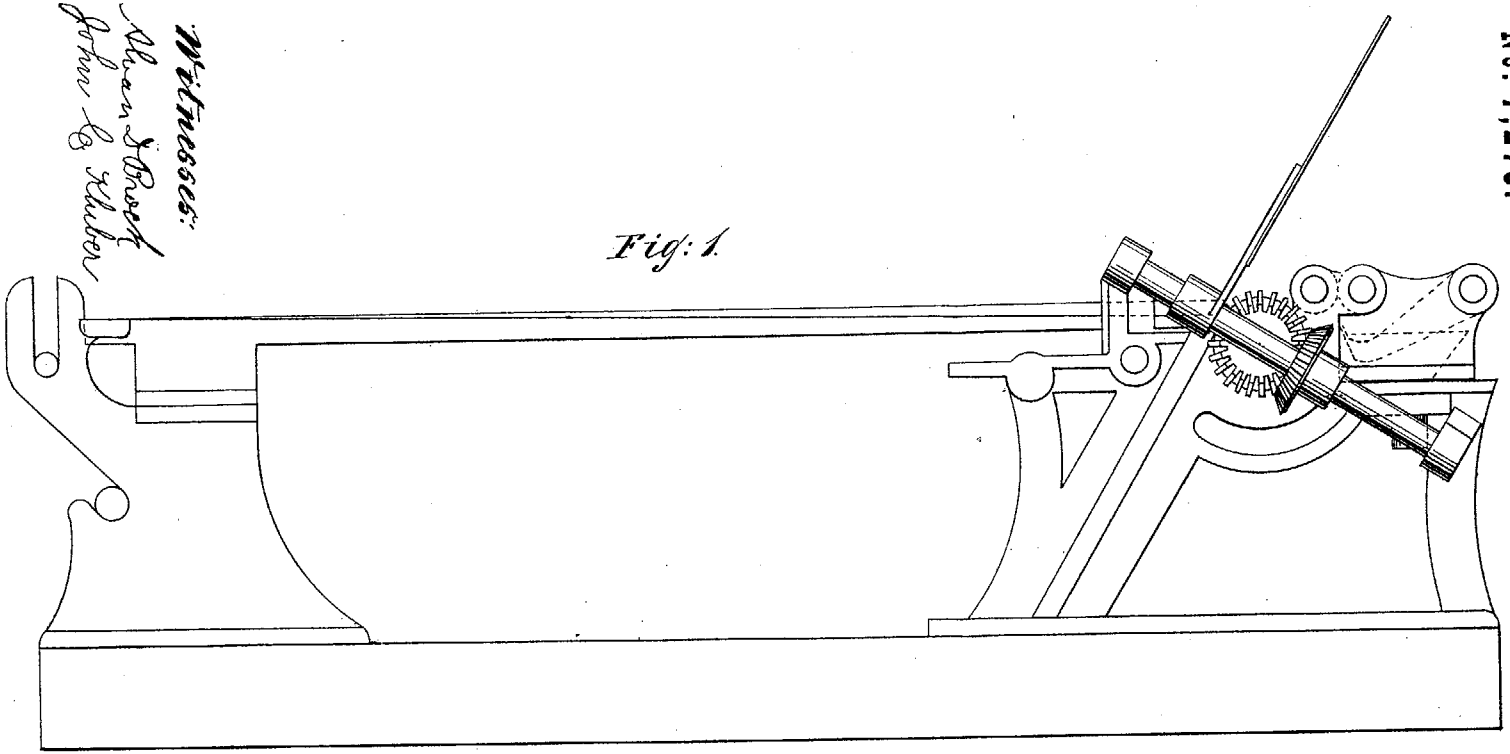

3 Sheets—Sheet 1

C. H. MORGAN.

Assignor by mesne assignments to THE UNION PAPER BAG MACHINE COMPANY.

PAPER-BAG MACHINE.

No. 7,273. Reissued Aug. 22, 1876.

Witnesses:
Alvan D. Brock
John C. Kluber

Chas. H. Morgan
Assignor
Inventor.
The Union Paper Bag Machine Co.
by Munn & Philipp
Att'ys.

THE NORRIS PETERS CO., PHOTO-LITHO., WASHINGTON, D. C.

3 Sheets—Sheet 2.
C. H. MORGAN.
Assignor by mesne assignments to THE UNION PAPER BAG MACHINE COMPANY.
PAPER-BAG MACHINE.
No. 7,273. Reissued Aug. 22, 1876.
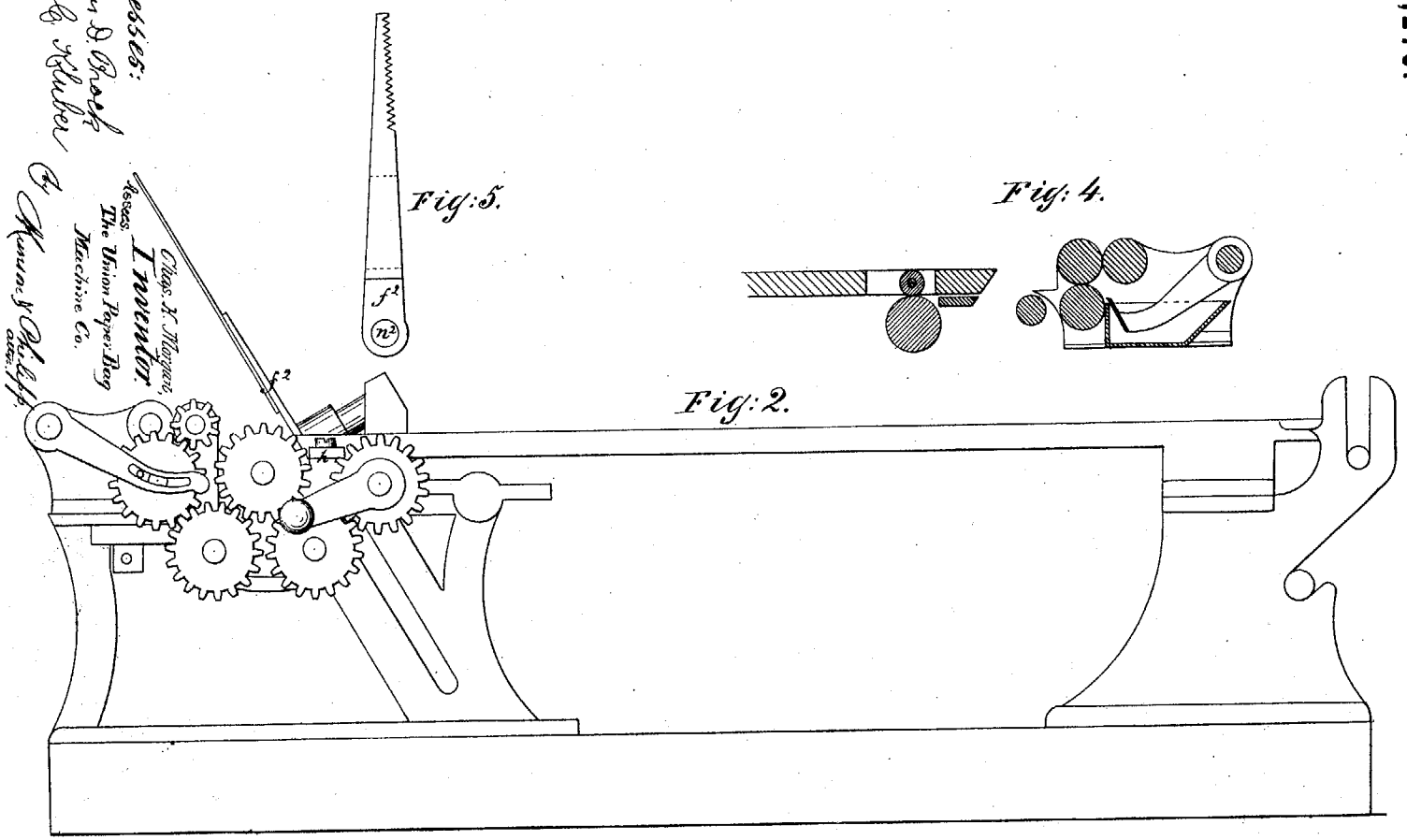
THE NORRIS PETERS CO., PHOTO-LITHO., WASHINGTON, D. C.

C. H. MORGAN.
Assignor by mesne assignments to THE UNION PAPER BAG MACHINE COMPANY.
PAPER-BAG MACHINE.
No. 7,273. Reissued Aug. 22, 1876.
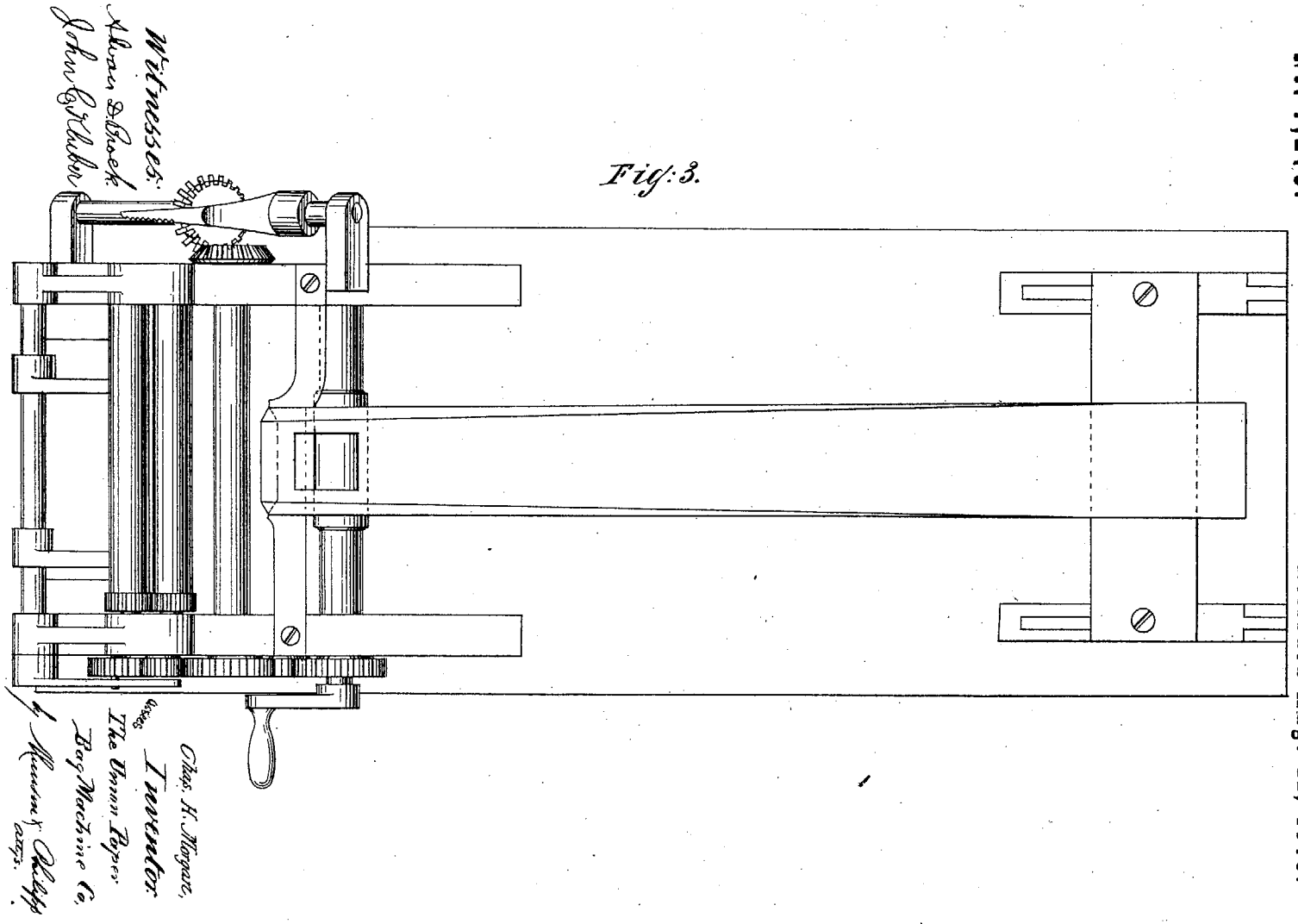
THE NORRIS PETERS CO., PHOTO-LITHO., WASHINGTON, D. C.

UNITED STATES PATENT OFFICE.

CHARLES H. MORGAN, OF PHILADELPHIA, PENNSYLVANIA, ASSIGNOR, BY MESNE ASSIGNMENTS, TO THE UNION PAPER BAG MACHINE COMPANY, OF SAME PLACE.

IMPROVEMENT IN PAPER-BAG MACHINES.

Specification forming part of Letters Patent No. 37,726, dated February 17, 1863; reissue No. 7,273, dated August 22, 1876; application filed July 12, 1876.

*To all whom it may concern:*

Be it known that CHARLES H. MORGAN, of the city and county of Philadelphia, State of Pennsylvania, (formerly of Clinton, in the county of Worcester, State of Massachusetts,) did invent a new and Improved Machine for Making Paper Bags; and the following is declared to be a full, clear, and exact description of the same, reference being had to the accompanying drawing, in which—

Figures 1 and 2 are opposite side elevations of a machine with my improvements. Fig. 3 is a plan of the same. Fig. 4 is a central longitudinal vertical section of part of the machine. Fig. 5 is a face view of the knife for cutting the bags from the roll of paper, and an end view of its shaft.

Similar letters of reference indicate corresponding parts in the several figures.

The invention relates to that class of paper-bag machines in which the paper from a roll, as a continuous sheet or web, is formed into a flattened tube, and afterward cut into proper lengths to form the bags, such machines constituting the subject-matter of Letters Patent granted to B. F. Rice, April 28, 1857, and reissued March 6, 1860.

The improvements consist in so organizing the severing device or cutting-off blade and its operating mechanism, in connection with the feed-rolls and supporting-bar, as to admit of a constant instead of an intermitting or variable movement of the feed-rolls, thereby accomplishing a continuous movement of the paper; also, in an improved mechanism which serves to hold the paper web or tube while being severed; also, in the mechanism for pasting and folding the bottom of the bag, and in details of construction which simplify the machine and greatly facilitate the manufacture of bags.

To enable others to make and use my invention, I will proceed to describe its construction and operation.

*d d* are the standards which support the tube-supporting bar, or "former," *e*, and contain bearings for the shaft *f*. *o g* are the feed-rolls, of which *o* has its bearings in the bar or former *e*, and derives its motion by surface-contact with *g*, the latter having its bearings in two standards, *b b*, and constituting also the main shaft of the machine. The roll of paper is placed on the shaft *f*, and is progressively bent or folded around the bar or former *e* by means of guides as it is drawn forward by the feed-rolls *o g*. The paper, on reaching the feed-rolls, has been folded, and had its edges pasted together, forming a complete tube, flattened nearly together.

The tube-forming mechanism which I have thus far described is the same as is fully described in the specification of the aforesaid Letters Patent of B. F. Rice, except that the feed-rollers *o g* have a constant motion.

In Rice's machine the feed-rolls have an intermitting or variable motion given them by a complex combination of cog-wheels, links, and a crank, whereby the paper is caused to stop, or nearly stop, not only while the severance or cutting off of the portion of the tube to form the bag is performed, but while the cutting-off blade is retreating; whereas, in this machine, the severing device or blade does not retreat, but revolves with a constant motion, and is so arranged as to describe so slight an angle of its revolution while severing the paper that the web or tube is not sensibly impeded in its progress, but allowed to be fed forward constantly by the feed-rolls.

I will now proceed to describe these parts of the machine in detail: $b^2$ is a gear-wheel on the shaft *g*, gearing through a stud-gear, *u*, attached to one of the standards *b b*, with a gear-wheel, $e^2$, on a shaft, *s*, arranged parallel with *g*, in bearings in the standards *b b*, and thereby driving the said shaft *s*, at the opposite end of which is a miter-gear, $c^2$, engaging with a miter-gear, $d^2$, on the cutter-shaft $p^2$, and thereby imparting to the latter a constant rotary motion. The said shaft $p^2$ has secured to it an arm $f^2$, carrying the cutter-blade or severing device *r*, and it is arranged in fixed bearings at one side of the machine, with its axis in a plane perpendicular to the axis of the feed-rolls, but at such an inclination that the plane of revolution of the blade shall be such an angle with reference to the tube or paper-supporting bar as to sever the tube of paper with overlapping ends of sufficient length to form the bottom of the bag. The end of the bar *e* forms a fixed blade, against which the upper half of the tube is severed, and below it is the fixed blade *h*, against which the lower half is severed.

Just before the tube is cut it is seized by a pair of rolls, *m k*, which hold it taut while it is being cut. These rolls are arranged one above the other and parallel with the feed-rolls, and are geared together, and with a third roll, *n*, arranged parallel with them in front of the roll *m* by gears $m^1$ $n'$, and all have their bearings fixed, except so far as it may be necessary for *k* and *n* to move toward and from *m*, to enable them to adapt themselves to different thicknesses of paper. The said rolls derive a constant rotary motion from the gear $e^2$ on the shaft *s*, through two stud-gears, *t* and *v*, of similar size to $e^2$, attached to the framing, the latter gearing with a spur-gear, $m^2$, on the roller *m*.

The pair of rolls *m k* project the severed portion of the tube over the edge of a blade, $k^2$, a sufficient distance to form the bottom lap, when the said blade simultaneously pastes and folds the lap by pressing it between the rolls *m n*, which seize the bag, press the lap together, and discharge the bag from the machine. The said blade takes the paste from a stationary box, *j*, arranged under the roll *n*, and is operated to perform the folding of one bag and take a fresh supply of paste for the succeeding one, by being attached to the arms *y y* of a rock-shaft, *x*, which is arranged in fixed bearings, and derives the necessary motion from a crank-pin, $t^2$, attached to the gear *v*, such crank-pin working in a slotted arm, *w*, secured to the said shaft.

It may be observed that the above-described mechanism for folding and pasting the bottom of the bag operates without any such oscillating movement of the folding-rolls as is given in Rice's machine.

Having thus fully described the invention, what is claimed as of the invention of CHARLES H. MORGAN is—

1. The combination, with a revolving severing device, substantially as described, of a stationary paper-supporting plate, *h*, and tension or holding rollers.

2. The combination, with a paper web or tube supporting device, of a revolving severing device and devices for holding the paper web taut while being severed, all substantially as described.

3. The combination, with a paper-tube-supporting bar, of a revolving severing device and a pair of holding-rollers, as *m k*, all substantially as described.

4. The constantly-moving feed-rolls, acting in combination with a web or tube supporting device, all substantially as described.

5. A revolving blade, in combination with tube-supporting bars or plates, to sever portions of tube with overlapping ends, all substantially as described.

6. A pair of rolls which hold the tube while being severed, in combination with a blade, which pastes and folds the tube and forms the bottom of the bag.

In witness whereof THE UNION PAPER BAG MACHINE COMPANY, by EDWIN J. HOWLETT, president, have hereunto set their hand.

THE UNION PAPER BAG MACHINE CO.,
By EDWIN J. HOWLETT, *Prest.*

Witnesses:
H. T. MUNSON,
M. B. PHILIPP.